(12) United States Patent
Chen et al.

(10) Patent No.: US 7,843,395 B2
(45) Date of Patent: Nov. 30, 2010

(54) TOUCH PEN HAVING AN ANTENNA AND ELECTRONIC DEVICE HAVING THE TOUCH PEN

(75) Inventors: Li-Ying Chen, Taipei Hsien (TW); Ju-Wen Teng, Taipei Hsien (TW)

(73) Assignees: Giga-Byte Communications Inc., Tainan (TW); Giga-Byte Technology Co., Ltd., Taipei (TW)

( * ) Notice: Subject to any disclaimer, the term of this patent is extended or adjusted under 35 U.S.C. 154(b) by 861 days.

(21) Appl. No.: 11/751,714

(22) Filed: May 22, 2007

(65) Prior Publication Data
US 2008/0291178 A1 Nov. 27, 2008

(51) Int. Cl.
*H01Q 1/24* (2006.01)

(52) U.S. Cl. ..................... 343/702; 343/901

(58) Field of Classification Search ............... 343/702, 343/900, 901; 455/575.7
See application file for complete search history.

(56) References Cited

U.S. PATENT DOCUMENTS

| | | | |
|---|---|---|---|
| 5,739,793 A * | 4/1998 | Adachi | ........................ 343/702 |
| 5,889,512 A | 3/1999 | Moller et al. | |
| 6,262,684 B1 | 7/2001 | Stewart et al. | |
| 6,275,193 B1 | 8/2001 | Nilsen et al. | |
| 7,656,355 B2 * | 2/2010 | Hsin | ........................... 343/702 |
| 2009/0073056 A1 * | 3/2009 | Hsin | ........................... 343/702 |

FOREIGN PATENT DOCUMENTS

| | | |
|---|---|---|
| EP | 1653325 A1 | 10/2005 |
| EP | 1635421 A1 | 3/2006 |

* cited by examiner

*Primary Examiner*—HoangAnh T Le
(74) *Attorney, Agent, or Firm*—Chun-Ming Shih; HDLS IPR Services

(57) ABSTRACT

An electronic apparatus has a touch pen. The touch pen includes a pen tube and an antenna. The pen tube has a hollow tube body and a touch end. The tube body is used to accommodate the antenna. Further, the antenna has a fixed tube body and a telescopic tube body. The interior of the fixed tube body is provided with electronic circuit and is electrically connected with the telescopic tube body. Therefore, when the touch pen is accommodated in the electronic device and is electrically connected with the electronic device, the electronic device can receive the wireless signals via the antenna within the touch pen. Alternatively, the antenna is provided within the electronic device directly and is electrically connected thereto, so that the electronic device can be kept to have a function of receiving the wireless signals during the use of the touch pen.

23 Claims, 6 Drawing Sheets

TOUCH PEN HAVING AN ANTENNA AND ELECTRONIC DEVICE HAVING THE TOUCH PEN

BACKGROUND OF THE INVENTION

1. Field of the Invention

The present invention relates to an electric touch pen, and in particular to an electric touch pen having an antenna.

2. Description of Prior Art

The advancement of modern science and technology prompts the development of the computer industry. So far, computer hardware not only plays an important role in industry and commerce, but also becomes a good assistant in daily life because of the versatility and miniaturization thereof. The rise and development of Internet indeed makes the computer to become an important part of life entertainment. Since the Internet is capable of transmitting information to anyplace in the world, people can receive various kinds of information by using the computer at home. Even, people can watch various movies or television programs via the Internet.

Then, the development of the wireless signal technology improves the capability of Internet to a nearly boundless extent. Therefore, with the transmission of wireless signals, people can use a portable electronic device functioning as a computer to access the Internet or receive video/audio information at an indoor or outdoor site. In order to facilitate the portable computer device to receive the wireless signals completely, besides the support of hardware and software, it is necessary to provide an antenna to receive the wireless signals.

Since the wireless signal technology develops very fast, the common portable electronic device that has a function of a computer, such as a popular personal digital assistant, is not provided with an antenna. Therefore, it is necessary to provide an additional antenna device to help the personal digital assistant to receive the wireless signals. However, it is inconvenient to carry such an additional antenna. Further, the user may need to buy different kinds of antennas depending on the specifications of the portable devices, which causes a further trouble to the user.

In the latter conventional portable personal digital assistant, in order to solve the problem caused by the addition antenna, the personal digital assistant is particularly provided with a hidden antenna, thereby solving the inconvenience caused by providing the antenna externally. However, the structure of the personal digital assistant is limited and the antenna is different in properties and specifications, the personal digital assistant cannot be additionally provided with an antenna for receiving various signals. Thus, it is necessary to find another solution whereby the personal digital assistant can receive the wireless signals easily and conveniently.

SUMMARY OF THE INVENTION

The present invention is to provide a touch pen having a hidden and separate antenna and an electronic device having such a touch pen. The touch pen that is used to touch the screen of the electronic device is provided with an antenna. The antenna is hidden, and during the use of the touch pen, the antenna can be separated so as to electrically connect with the electronic device, thereby keeping the electronic device to have a function of receiving wireless signals.

In order to achieve the above objects, the present invention provides a touch pen having an antenna and an electronic device having the touch pen. The touch pen includes a pen tube and an antenna. The pen tube has a hollow tube body and a touch end. The tube body is used to accommodate the antenna. Further, the antenna has a fixed tube body and a telescopic tube body. The interior of the fixed tube body is provided with electronic circuit and is electrically connected with the telescopic tube body. Therefore, when the touch pen is accommodated in the electronic device and is electrically connected with the electronic device, the electronic device can receive the wireless signals via the antenna in the touch pen. Alternatively, the antenna is provided within the electronic device directly and is electrically connected thereto, so that the electronic device can be kept to have a function of receiving the wireless signals during the use of the touch pen.

DETAILED DESCRIPTION OF THE INVENTION

The technical contents of the present invention will be explained with reference to the accompanying drawings.

Figure 1:
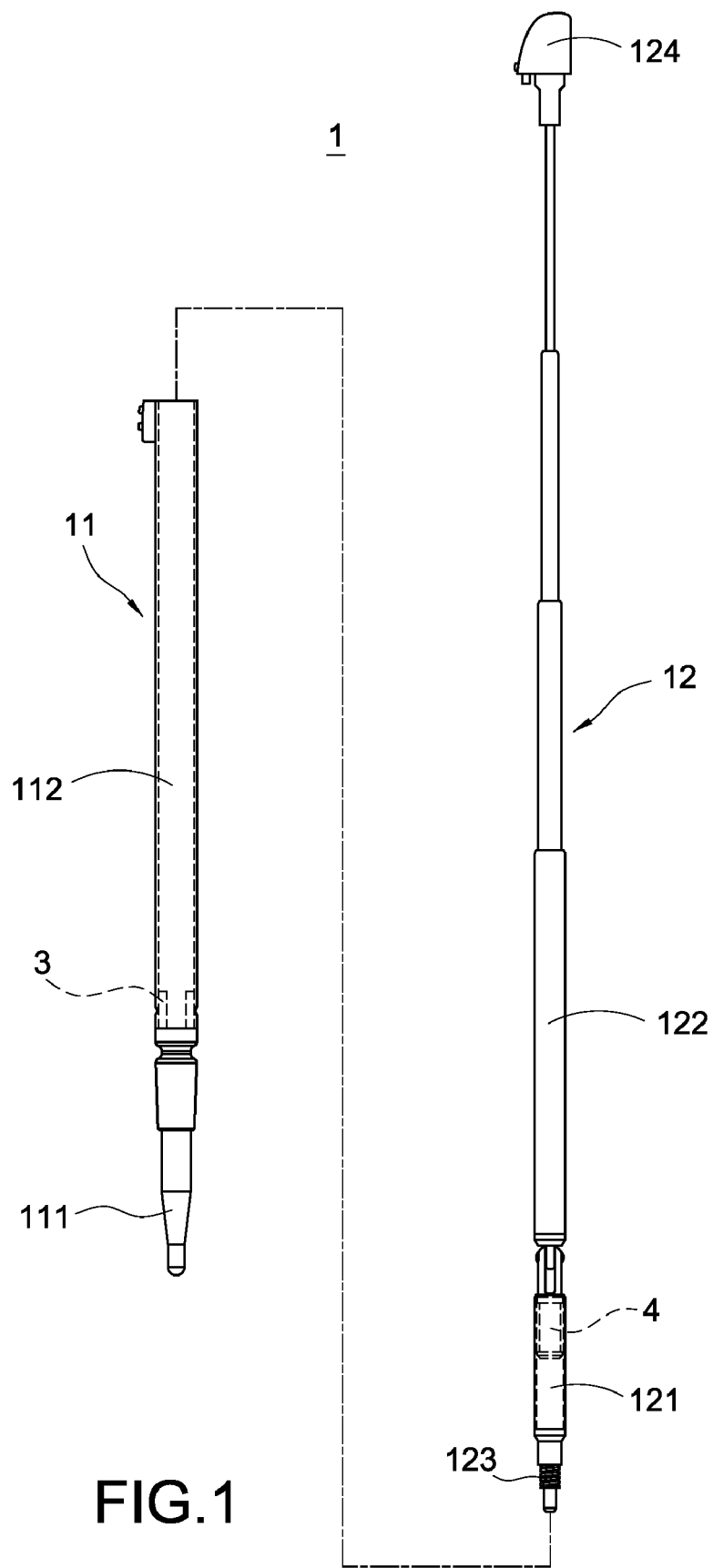
FIG. 1 is an exploded perspective view showing the structure of the present invention.
Figure 2:
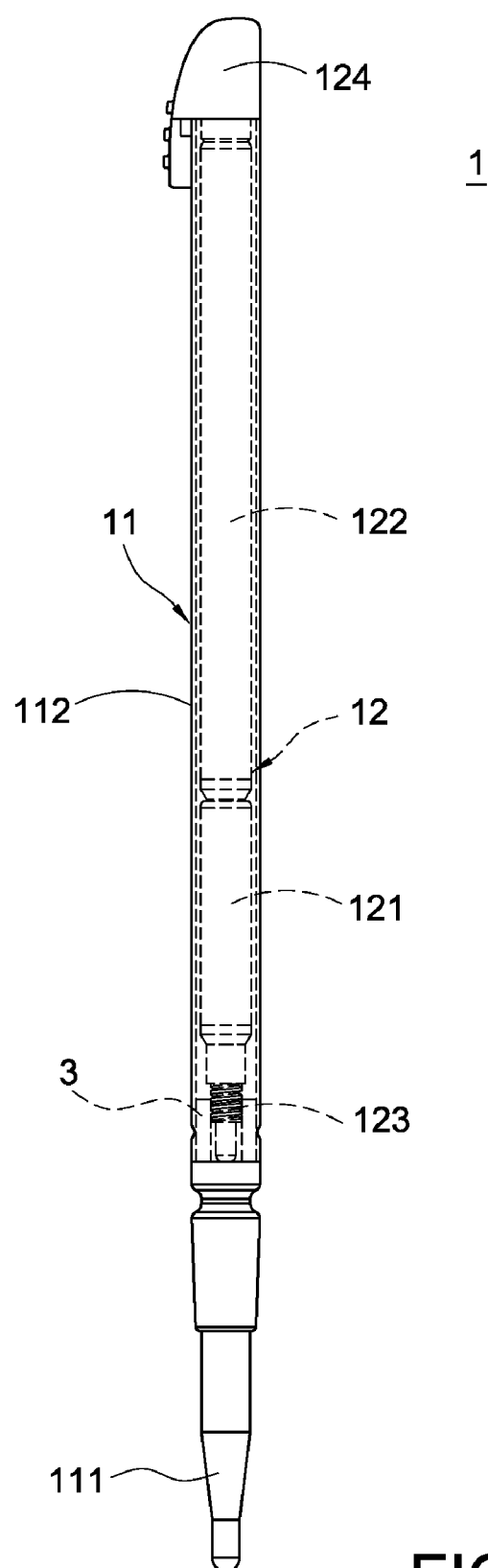
FIG. 2 is an assembled view of the present invention.

FIG. 1 and FIG. 2 are an exploded perspective view and an assembled view of the present invention, respectively. It can be seen that, the touch pen 1 of the present invention includes a pen tube 11 and an antenna 12. The pen tube 11 has a touch end 111 and a tube body 112. The touch end 111 is used to touch a screen of an electronic device. The tube body 112 is a hollow metallic tube body that is used to accommodate the antenna 12. The inner periphery of the bottom of the tube body 112 is provided with metallic elastic pieces 3. In the present embodiment, there is a plurality of metallic elastic pieces. Furthermore, the antenna 12 is formed into a rod-like shape for receiving the wireless signals. The antenna 12 has a fixed tube body 121 and a telescopic tube body 122. The interior of the fixed tube body 121 is provided with electronic circuit 4. The fixed tube body 121 and the telescopic tube body 122 are electrically connected to each other, thereby forming a wireless signal reception region. Further, the front end of the fixed tube body 121 has a contact end 123. The contact end 123 is made of metal and is electrically connected with the internal electronic circuit 4. The top of the telescopic tube 122 is connected to a cover 124. After the antenna 12 is accommodated in the hollow tube body 112, the cover 124 is connected to the top of the hollow tube body 112, thereby fixing the position of the antenna 12 with respect to the pen tube 11. Further, after the antenna 12 is accommodated in the tube body 112, the touch end 123 of the antenna 12 is adhered to the metallic elastic piece 3 provided in the tube body 112, so that the electronic circuit 112 provided in the antenna 12 can be electrically connected with the tube body 112. The complete assembly of the present invention is shown in FIG. 2.

Figure 3:
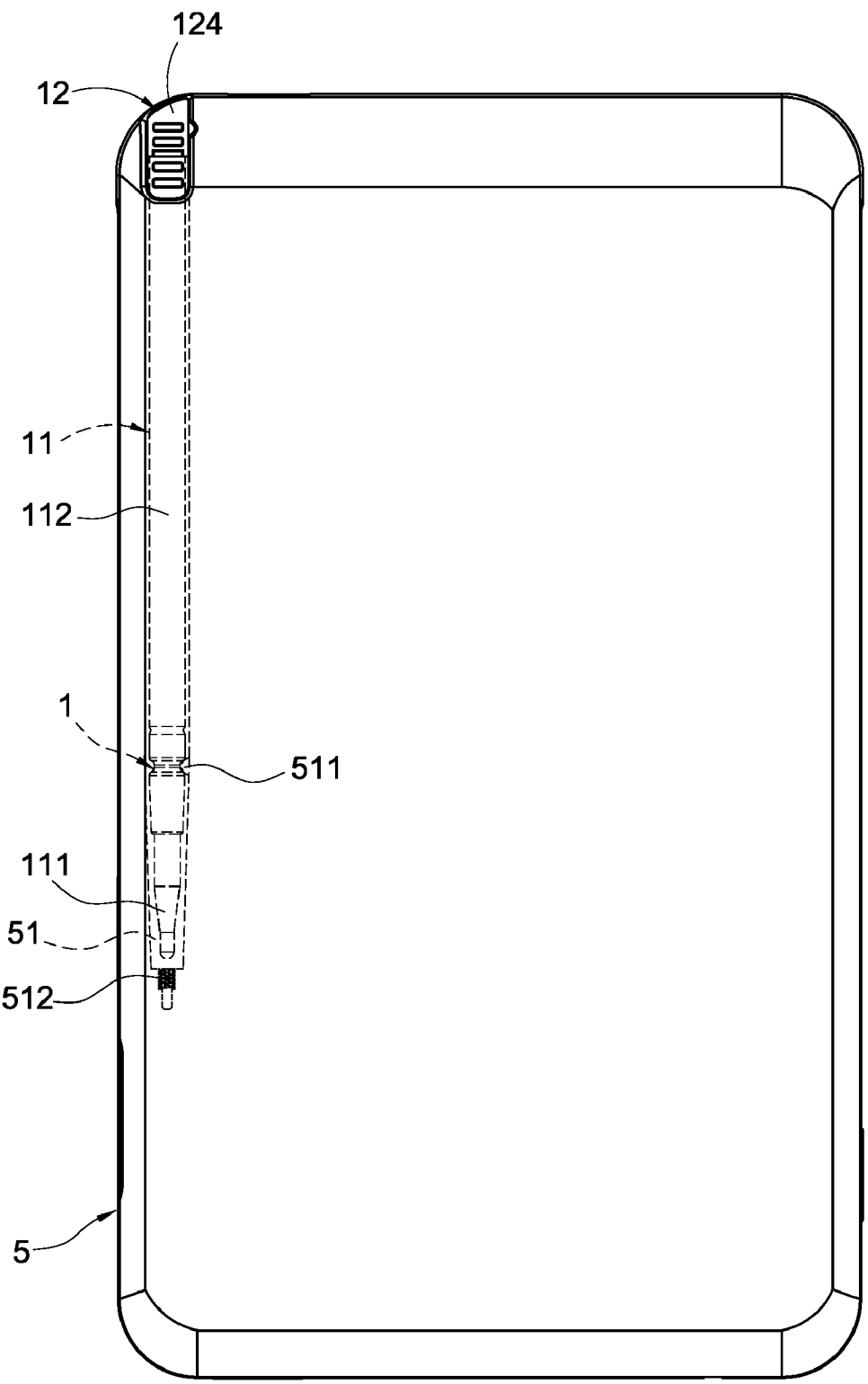
FIG. 3 is a schematic view (I) showing the operation of the present invention.
Figure 4:
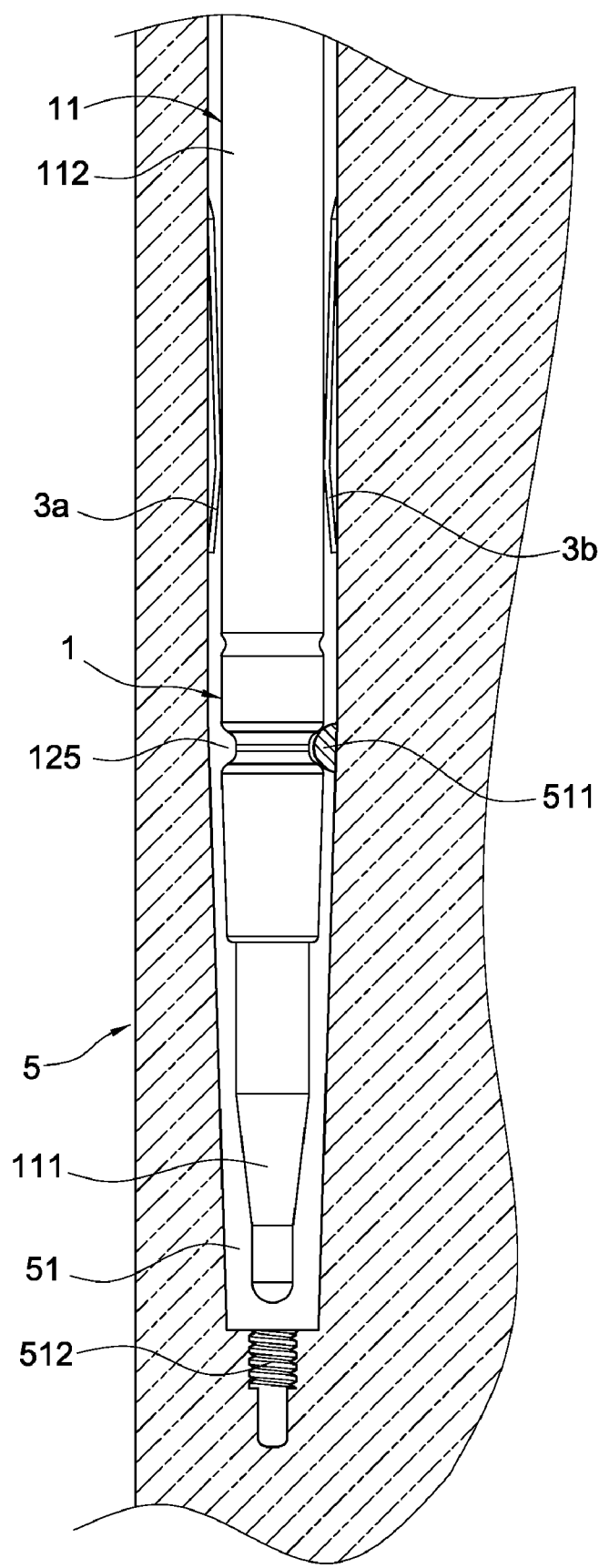
FIG. 4 is a partially enlarged view of the present invention.

FIG. 3 is a schematic view showing the operation of the present invention, and FIG. 4 is a partially enlarged view of the present invention. As shown in FIG. 3, the touch pen 1 of the present invention can operate by means of holding it to touch an electronic device 5. In the present embodiment, the electronic device 5 is a personal digital assistant, in which the back surface of the housing of the electronic device 5 is provided with an accommodating trough 51. The inner periphery of the accommodating trough 51 is provided with a protruding pillar 511. The upper end of the protruding pillar 511 is provided with a plurality of metallic elastic pieces 3a and 3b. The metallic elastic pieces 3a and 3b are electrically connected with the electronic device 5. Further, the bottom of the accommodating trough 51 is provided with a conductive pillar 512. Therefore, when the touch pen 1 is accommodated in the accommodating trough 51 and located in a predetermined position, the protruding pillar 511 is exactly engaged in a recessed region 125 formed between the touch end 111 of the pen tube 11 and the tube body 112, thereby fixing the position of the touch pen 1 in the accommodating trough 51. Further, the plurality of metallic elastic pieces 3a and 3b provided on the upper end of the protruding pillar 511 abut against the outer surface of the tube body 112 collectively, so that the antenna 12 within the tube body 112 can be electrically connected with the electronic device 5 via the tube body 112 and the metallic elastic pieces 3a and 3b. As a result, the electronic device 5 can receive wireless signals via the antenna 12 in the touch pen 1.

Figure 5:
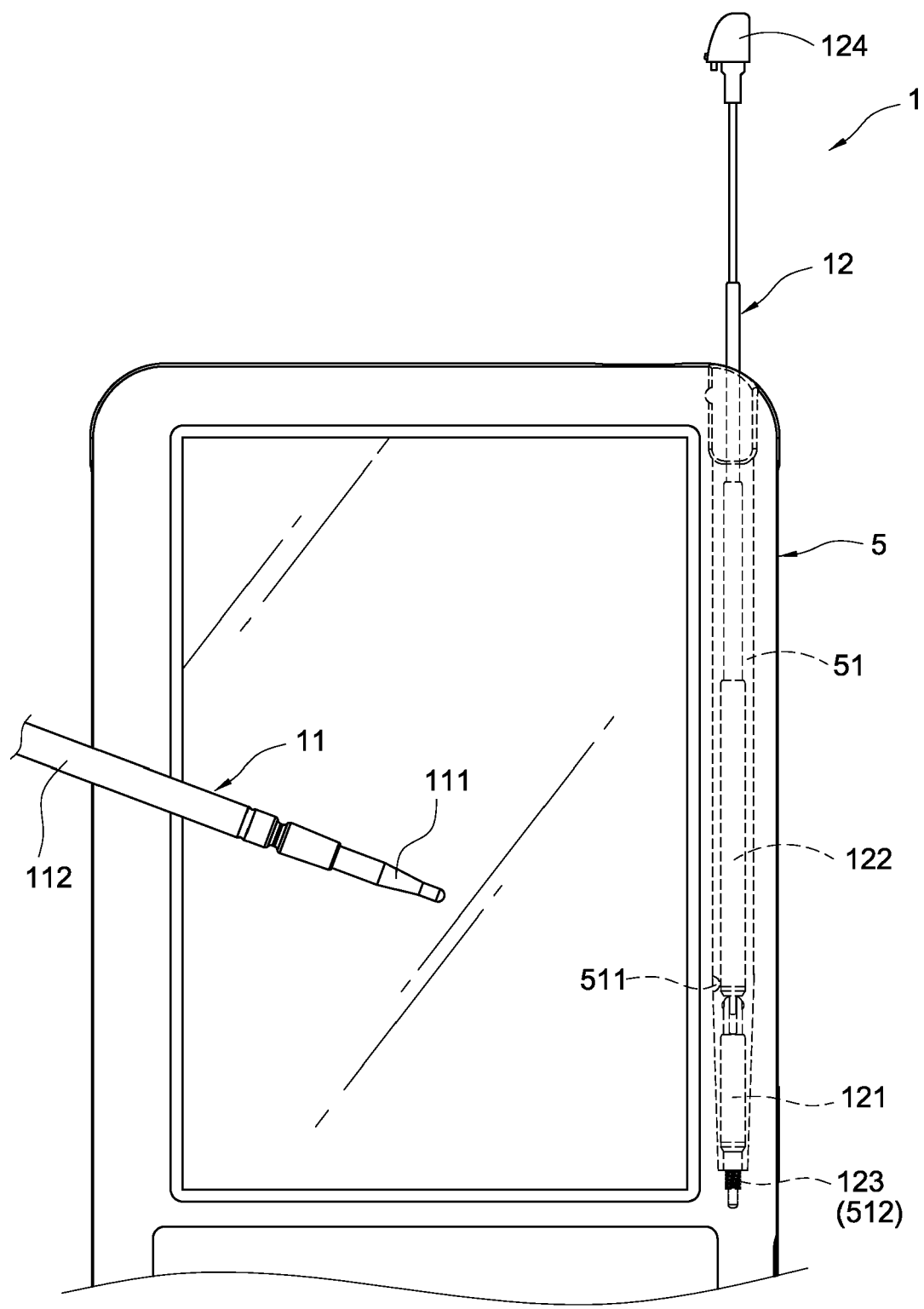
FIG. 5 is a schematic view (II) showing the operation of the present invention.

With reference to FIG. 5, it is a schematic view showing another operation of the present invention. It can be seen that, when the user intends to use the touch pen 1 to operate the electronic device 5, the user can draw out the antenna 12 from the tube body 112. Then, after the telescopic tube body 122 gets elongated, the antenna 12 is accommodated in the accommodating trough 51 while the contact end 123 of the antenna 12 is electrically connected with the conductive pillar 512 on the bottom of the accommodating trough 51. In this way, when the use uses the pen tube 11 of the touch pen 1 to operate the electronic device 5, the electronic device 5 can receive the wireless signals within the reception region via the antenna 12. Therefore, the user can use the electronic device 5 to receive the resources of the wireless Internet or receive/transmit signals.

Figure 6:
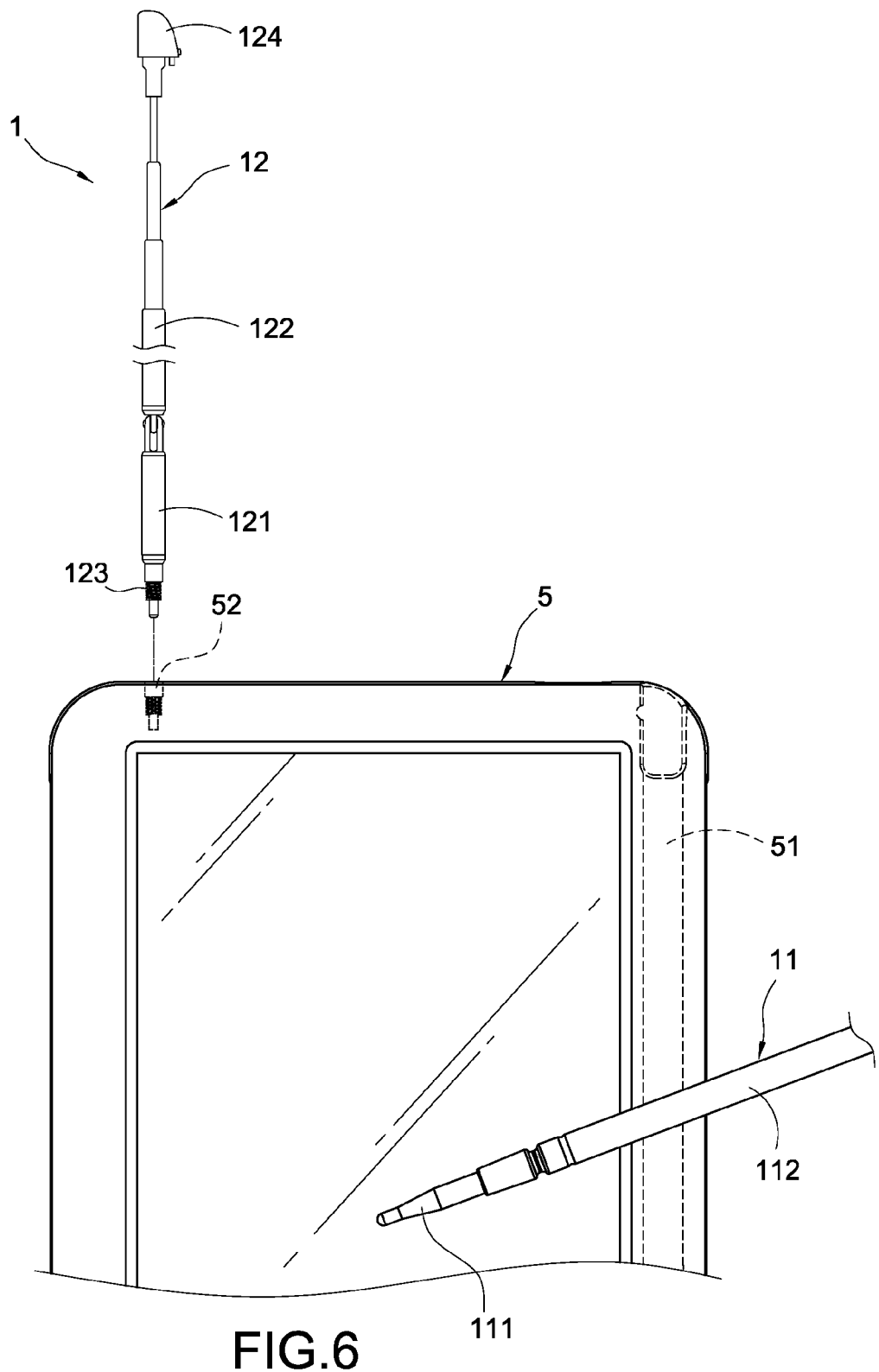
FIG. 6 is a schematic view showing the operation of another embodiment of the present invention.

With reference to FIG. 6, it is a schematic view showing the operation of another embodiment of the present invention. As shown in the figure, one end of the electronic device 5 (in the present embodiment, e.g. a personal digital assistant) is provided with a conductive trough 52. In the present embodiment, the conductive trough 52 is provided at a position corresponding to that of the accommodating trough 41. The conductive trough 52 is electrically connected with the internal circuit of the electronic device 5. When the user intends to use the touch pen 1 to operate the electronic device 5, the user can draw out the antenna 12 from the tube body 111 and elongate the telescopic tube body 122 of the antenna. Then, the contact end 123 of the antenna 12 is disposed in the conductive trough 52 of the electronic device 5. In the present embodiment, the antenna 12 is screwed to connect with the conductive trough 52 and thus is electrically connected with the antenna 12. As a result, the electronic device 5 can receive the wireless signals via the antenna 12, thereby utilizing the resources of wireless Internet or receiving other signals.

Although the present invention has been described with reference to the foregoing preferred embodiments, it will be understood that the invention is not limited to the details thereof Various equivalent variations and modifications can still occur to those skilled in this art in view of the teachings of the present invention. Thus, all such variations and equivalent modifications are also embraced within the scope of the invention as defined in the appended claims.

What is claimed is:

1. A touch pen having an antenna which is operated by holding to touch an electronic device, comprising:
a pen tube having a hollow metallic tube body; and
an antenna disposed inside the metallic tube body,
wherein after being detached from the pen tube, the antenna is accommodated in the electronic device and electrically connected with the electronic device, so that the electronic device is capable of receiving wireless signals via the antenna.

2. The touch pen having an antenna according to claim 1, wherein one end of the metallic tube body of the touch pen is further connected to a touch end for touching the electronic device.

3. The touch pen having an antenna according to claim 1, wherein an inner periphery of a bottom of the metallic tube body is provided with a metallic elastic piece for abutting against the antenna.

4. The touch pen having an antenna according to claim 3, wherein the antenna abuts against the metallic elastic piece and is electrically connected with the metallic tube body.

5. The touch pen having an antenna according to claim 1, wherein the antenna has a fixed tube body and a telescopic tube body.

6. The touch pen having an antenna according to claim 5, wherein an interior of the fixed tube body is provided with electronic circuit.

7. The touch pen having an antenna according to claim 6, wherein one end of the fixed tube body further has a contact end.

8. The touch pen having an antenna according to claim 7, wherein the contact end is made of metal and is electrically connected with the electronic circuit within the fixed tube body.

9. The touch pen having an antenna according to claim 5, wherein a top end of the telescopic tube body is further connected to a cover, and the cover is combined with the top end of the metallic tube body.

10. An electronic apparatus having a touch pen, comprising:
a housing having an accommodating trough thereon;
a touch pen accommodated in the accommodating trough and electrically connected with the electronic device, the touch pen comprising:
a pen tube having a hollow metallic tube body that allows by holding to touch an electronic device; and
an antenna disposed inside the metallic tube body,
wherein after being detached from the pen tube, the antenna is electrically connected with the electronic device so that the electronic device is capable of receiving wireless signals.

11. The electronic apparatus having a touch pen according to claim 10, wherein the electronic device is a personal digital assistant.

12. The electronic apparatus having a touch pen according to claim 10, wherein the electronic device is provided with a conductive trough thereon.

13. The electronic apparatus having a touch pen according to claim 12, wherein the conductive trough is located at a position corresponding to that of the accommodating trough.

14. The electronic apparatus having a touch pen according to claim 10, wherein an interior of the accommodating trough is provided with a protruding pillar, and an outer periphery of the pen tube has a recessed region for engaging with the protruding pillar.

15. The electronic apparatus having a touch pen according to claim 14, wherein an upper edge of the protruding pillar is provided with a metallic elastic piece for electrically connecting with the electronic device.

16. The electronic apparatus having a touch pen according to claim 10, wherein a bottom of the accommodating trough is provided with a conductive pillar, and the conductive pillar is electrically connected with the electronic device.

17. The electronic apparatus having a touch pen according to claim 10, wherein an inner periphery of a bottom of the metallic tube body is provided with a metallic elastic piece for abutting against the antenna.

18. The electronic apparatus having a touch pen according to claim 17, wherein the antenna abuts against the metallic elastic piece and is electrically connected with the metallic tube body.

19. The electronic apparatus having a touch pen according to claim 10, wherein the antenna has a fixed tube body and a telescopic tube body.

20. The electronic apparatus having a touch pen according to claim 19, wherein an interior of the fixed tube body is provided with electronic circuit.

21. The electronic apparatus having a touch pen according to claim 20, wherein one end of the fixed tube body further has a contact end.

22. The electronic apparatus having a touch pen according to claim 21, wherein the contact end is made of metal and is electrically connected with the electronic circuit in the fixed tube body.

23. The electronic apparatus having a touch pen according to claim 10, wherein top end of the telescopic tube body is further connected to a cover, and the cover is combined with the top end of the metallic tube body.

* * * * *